(12) United States Patent
Newman et al.

(10) Patent No.: US 10,078,125 B2
(45) Date of Patent: Sep. 18, 2018

(54) BEACON SECURITY

(71) Applicant: VERVE WIRELESS, INC., Carlsbad, CA (US)

(72) Inventors: Daniel Newman, Denver, CO (US); Dustin Candland, Centennial, CO (US); Daniel Pier, Englewood, CO (US)

(73) Assignee: Verve Wireless, Inc., Santa Clara, CA (US)

( * ) Notice: Subject to any disclaimer, the term of this patent is extended or adjusted under 35 U.S.C. 154(b) by 330 days.

(21) Appl. No.: 15/031,862

(22) PCT Filed: Oct. 24, 2014

(86) PCT No.: PCT/US2014/062157
§ 371 (c)(1),
(2) Date: Apr. 25, 2016

(87) PCT Pub. No.: WO2015/061673
PCT Pub. Date: Apr. 30, 2015

(65) Prior Publication Data
US 2016/0266227 A1   Sep. 15, 2016

Related U.S. Application Data

(60) Provisional application No. 61/895,458, filed on Oct. 25, 2013.

(51) Int. Cl.
| | |
|---|---|
| *G01S 1/00* | (2006.01) |
| *G01S 1/68* | (2006.01) |
| *H04W 12/02* | (2009.01) |
| *H04W 4/80* | (2018.01) |
| *H04L 29/06* | (2006.01) |

(52) U.S. Cl.
CPC ................. *G01S 1/68* (2013.01); *H04W 4/80* (2018.02); *H04W 12/02* (2013.01); *H04L 63/0435* (2013.01)

(58) Field of Classification Search
CPC ............ G01S 1/68; H04W 4/80; H04W 48/10
USPC ................ 342/385, 386, 414; 713/169, 170; 455/41.2
See application file for complete search history.

(56) References Cited

U.S. PATENT DOCUMENTS

| | | |
|---|---|---|
| 7,073,066 B1 | 7/2006 | Nessett |
| 7,869,807 B2 | 1/2011 | Shimizu |
| 7,890,745 B2 | 2/2011 | Qi et al. |

(Continued)

FOREIGN PATENT DOCUMENTS

WO   WO 2013/056143   4/2013

OTHER PUBLICATIONS

International Search Report and Written Opinion for International (PCT) Patent Application No. PCT/US2014/062157, dated Feb. 6, 2015 8 pages.

(Continued)

*Primary Examiner* — Dao Linda Phan (57) ABSTRACT

The present disclosure is directed to systems and methods that include a beacon that includes an antenna; data storage configured to store a code that is calculated according to an algorithm and based on a first variable, the first variable being defined according to a first interval of time; and a processor configured to cause the code to be emitted by the beacon.

23 Claims, 6 Drawing Sheets

(56) References Cited

U.S. PATENT DOCUMENTS

| | | |
|---|---|---|
| 8,208,627 B2 | 6/2012 | Pauker et al. |
| 8,265,652 B2 | 9/2012 | Piersol et al. |
| 8,411,662 B1 | 4/2013 | Saund et al. |
| 2001/0033012 A1 | 10/2001 | Kommerling et al. |
| 2007/0014269 A1* | 1/2007 | Sherman ............... H04J 3/0661 370/338 |
| 2007/0254614 A1 | 11/2007 | Muralidharan et al. |
| 2012/0284517 A1 | 11/2012 | Lambert |
| 2017/0011425 A1* | 1/2017 | Proctor, Jr. ........... H04W 4/029 |

OTHER PUBLICATIONS

International Preliminary Report on Patentability for International (PCT) Patent Application No. PCT/US2014/062157, dated May 6, 2016 7 pages.

* cited by examiner

BEACON SECURITY

CROSS-REFERENCE TO RELATED APPLICATION

This application is a national stage application under 35 U.S.C. 371 of PCT Application No. PCT/US2014/062157, having an international filing date of Oct. 24, 2014, which designated the United States, Which. PCT Application claimed the benefit of to U.S. Provisional Application Ser. No. 61/895,458, filed Oct. 25, 2013, both of which are incorporated by reference in their entirety.

TECHNICAL FIELD

The present disclosure relates to systems and methods for securing devices. In particular, the present disclosure relates to systems and methods for securing beacon devices.

BACKGROUND

Electronic devices (also referred to herein as "mobile devices" or "devices"), such as cellular phones, laptops, and tablets, among others, are commonly used by people today. A modern mobile device can incorporate functions of a computer, of a cellular transceiver, or a wireless (e.g., WiFi™, Bluetooth®) transceiver. For example, mobile devices can perform traditional computer functions, such as executing application programs, storing various data, and displaying digital images and other data.

When the mobile device functions as a cellular transceiver, the mobile device can initiate and receive phone calls, send and receive data over a cellular network, identify cellular tower connections, and determine when and whether to switch cellular towers. Similarly, the mobile device can function as a wireless radio transceiver and send and receive data over a wireless network, e.g. a WiFi™ network or Bluetooth® wireless technology.

SUMMARY

Beacons are physical devices that transmit (e.g., broadcast) wireless signals that are received by other devices. Beacons may have various uses, such as placement within stores, shopping malls, and parking lots in order to broadcast information useful to visitors. For example, beacons may transmit Bluetooth® wireless signals that may be received by mobile devices. However, anyone with a compatible mobile device can receive and read beacon transmissions because the information beacons transmit (including their unique identifiers) is not secured. The person may then be able to correlate the physical location of the beacon to the beacon identifiers. This is problematic because that person may then use the beacon transmissions, correlated to the locations, for their own purpose. Thus, when owners of beacons install the network of beacons for their use, unauthorized persons may also use the beacons for unauthorized uses. Therefore, there is a need for systems and methods for securing beacon devices.

Embodiments disclosed herein are directed to methods and system that include calculating a code according to an algorithm, where the code is based on a first variable and the first variable is defined according to a first interval of time. The code is used in a beacon transmission in place of beacon identifying information.

Additional embodiments of the present disclosure include methods and system that include limiting access to a beacon from a device based on an identifier, where a broadcast from the beacon includes the identifier.

Further embodiments of the present disclosure include systems and methods for receiving a transmission from a beacon at a device, where the transmission includes a code based on a beacon identifier; and correlating beacon data to a location based on the code. In various embodiments, the code may be obtained from a server, and the code may be one of a set of codes.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of illustrative embodiments, it should be appreciated that individual aspects of the disclosure can be separately claimed.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

As defined herein, a beacon is a short range communication device that provides a signal that can be detected by mobile devices within proximity of the beacon. In various embodiments, the beacon may have a known or fixed location. Examples of beacons include a radio frequency (RF) beacon (e.g., a Bluetooth® low energy (BLE) beacon), an infrared beacon, or a radio frequency identifier (RFID) tag. Signals may be transmitted according to various standards, including but not limited to ISO/IEC 18092, ISO/IEC 14443 A, ISO/IEC 14443, ISO 18000-6C, and IEEE 802.15.1, all of which are incorporated herein by reference.

Each beacon may have a built-in Bluetooth® 4.0 chip, also called a BLE or BLE chip. The hardware of a beacon may be placed into a case and the case may be placed in various locations. After installation (e.g., assembly or placement of the beacon device), the beacons may begin transmitting 2.4 GHz Bluetooth® signals, similar to WiFi. For example, a BLE beacon can broadcast an RF signal that includes, for example, identification (also called identifier) data (e.g., primary and secondary or major and minor), physical identifications (which may also be referred to as hardware identifications and Bluetooth® identifications and which may be unique to a specific beacon or location, for example), software identifications, location based services, advertisements, and position coordinates (e.g., latitude, longitude), which can be detected by a mobile device. In some embodiments, upon determining that a mobile device is within a specific location defined by a beacon network, information provided to a user of a mobile device may change.

In various embodiments, mobile devices can distinguish between beacons in a beacon network based on the beacon information and mobile beacons that may be detected in a scan, such as other Bluetooth® enabled mobile phones operating within the beacon network. For example, each beacon in the beacon network can provide data in its broadcast signal that indicates that the beacon is part of a beacon network. Alternatively, or in addition, when a mobile device makes first contact with a beacon in the beacon network, that beacon can transmit to the mobile device a list of unique identifiers (e.g., MAC addresses) of other beacons in the beacon network and other information about the beacon network, such as a name, location data, and one or more URLs to websites associated with the beacon network. Beacon networks can be located in any geographic region, including businesses (e.g., shopping malls, retail stores, restaurants), landmarks (e.g., museums, airports, parks, entertainment venues) and any other environments where location based services are desired.

Beacons may contain firmware and/or software that configure the beacon functions, such as the BLE broadcasts. In addition, beacons can have other functionality. For example, beacons may have connectivity to various types of electronic devices and servers and the ability to exchange data and information, including receiving and sending messages. Communication with beacons may be done using any type of supported protocol.

Mobile devices can detect signals (also referred to as broadcasts or transmissions) transmitted from beacons, and can use information contained in the signals to perform various computer functions, such as executing application programs, storing various data, and displaying digital images and other data. These functions can be performed, for example, in an application subsystem of the mobile device, which can include an application processor, an application operating system, and various input/output devices.

However, the availability of beacon information to any devices within range means that someone (e.g., an unauthorized user) may correlate beacons with their locations, for example, based on one or more of their unique identifier(s), and employ the correlated information for unauthorized actions. For example, if an owner of beacons sets up the beacons to be at various locations within an authorized retail store, the beacons could be misappropriated by an unauthorized user. In particular, the unauthorized user (who is a competitor of the authorized retail store) could obtain the beacon identifier data from the beacons in the authorized store, and map the beacon identifiers to the location information. The unauthorized user could then create an application, or modify a pre-existing application, to cause their customers to receive a coupon for the competing store on their mobile device whenever the device receives transmissions from the beacons within the authorized store. Thus, to misappropriate the beacons, the unauthorized user needs only to obtain the beacon identification data (which is publically available within the beacon transmissions) and correlate this data to the location of each beacon. Embodiments disclosed herein advantageously provide methods and systems to secure beacons against unauthorized uses.

In various embodiments, the present disclosure provides systems and methods to secure beacon devices. For example, the systems and methods can eliminate an unauthorized user's ability to map beacon identification data to location information by periodically generating identification codes (also referred to herein as secure identifiers/identifications or "Secure IDs") by using fixed data, variable data, and one or more algorithms. The algorithms may, for example, be predetermined algorithms and the algorithms may be unknown in advance and unknowable outside the administration of the systems and methods for securing beacons, even to authorized users of an apparatus using the fixed secret code with the algorithm. The algorithm constantly generates new unique and verifiable non-predictable codes (e.g., Secure IDs), which may be derived from the fixed data and at least one dynamic variable, such as a date or a time of day by the predetermined algorithm. The constant changes in the dynamic variables when processed by the algorithm (e.g., time variables) results in the generation of constantly changing Secure IDs for a beacon. Thus, an unauthorized user would not be able to correlate beacons with their locations because the identification information of the beacon changes periodically.

The fixed data may be, for example, beacon data such as the identification data (including any of primary and secondary or major and minor), the physical identification data, software identifications, and location data associated with the beacon or a set of beacons. Any type of fixed and variable data, including any combinations of fixed and variable data, is envisioned to be used in the embodiments disclosed herein. In various embodiments, the fixed data may include attributes of the beacon, such as profile attributes or service profile attributes, and may include any level of identification or classifying information. The variable data may include the dynamic variable, which may be a length of time, for example.

Different algorithms may be used on the various types of data (e.g., beacon identifiers, etc.), including deterministic and randomized algorithms, and obfuscation algorithms. Any type of algorithm is envisioned to be used in methods and systems of the present disclosure. An illustrative algorithm that may be used in embodiments of the present disclosure is an encryption algorithm that requires a "key" to be applied to view the data, such as a format preserving encryption (FPE) algorithm. The FPE algorithm can modify the data (e.g., one or more pieces of beacon identification data) to obtain the Secure IDs; for example, (for $\{0, \ldots, N-1\}$ a pseudorandom weight is assigned to each integer in the identification data, then the pseudorandom weight assignment is sorted by weight. The weights are defined by applying an existing block cipher to each integer. Thus, to create a FPE on the domain $\{0,1,2,3\}$, given a key K, AES(K) is applied to each integer, giving, for example, weight(0)=0x56c644080098fc5570f2b329323dbf62, weight(1)=0x08ee98c0d05e3dad3eb3d6236f23e7b7, weight(2)=0x47d2e1bf72264fa01fb274465e56ba20, and weight(3)=0x077de40941c93774857961a8a772650d. Sorting [0,1,2,3] by weight gives [3,1,2,0], so the cipher to obtain the Secure ID is F(0)=3, F(1)=1, F(2)=2, and F(3)=0. This is only one illustrative algorithm, and other algorithms may be used, including but not limited to Advanced Encryption Standard (AES), Data Encryption Standard (DES), Euclid's algorithm, and an integer relation algorithm, among others.

Secure IDs may be generated using an algorithm on the basis of dynamic variables defined by clock mechanisms according to time. Thus, an apparatus may synchronize a time definition of the dynamic variables by calculating sets of Secure IDs over time according to a predetermined algorithm. The algorithm can generate a first Secure ID on the basis of a first dynamic variable and a unique static variable, for example, and additional Secure IDs based on each previous Secure ID. In further embodiments, the time intervals that may be used as dynamic variables to obtain Secure IDs may be any definition of a time variable. For example, the time variables may be evenly spaced and have repeating durations, or they may have varying lengths of time.

The Secure IDs may be generated by any means, and stored in various locations. For example, codes may be generated and/or stored in the beacon itself, as well as on a mobile device or an application installed on a mobile device, a server, or some other apparatus. The Secure IDs may be calculated at any time, and may be calculated on a real time basis. Similarly, the other information including the dynamic and static variables and algorithms may also be stored and transmitted by various means not limited by the present disclosure. In addition, other security measures may be combined into the present disclosure; for example, an apparatus may comprise a microprocessor where the algorithm is stored in volatile dynamic memory encapsulated with an energizing mechanism. The energizing mechanism, when interrupted, may destroy all data including at least the algorithm and the static variable.

In a method for comparing Secure IDs generated by separate apparatuses on the basis of dynamic variables defined by separate clock mechanisms according to time where the Secure IDs match when the dynamic variables match, the methods may include methods for synchronizing the time definition of the dynamic variables. Thus, static variables may be input to an apparatus that include an algorithm, and the algorithm of the first apparatus may calculate a first Secure ID on the basis of the static variable and a first dynamic variable defined by a first interval of time when the inputting occurred according to one clock mechanism. The static variable and the first Secure ID may be input into a second apparatus, including the algorithm. The algorithm of the second computer may be used to calculate two or more second Secure IDs on the basis of the static variable and two or more second dynamic variables defined by a second interval of time in which the step of putting occurred according to a second clock mechanism. Various apparatuses may thus be able to calculate Secure IDs for beacons and determine if the Secure IDs match in order to synchronize with the beacon transmissions.

Volatile dynamic memory may be included in either or both of the first apparatus, an access control means, a host computer and a means for comparing, and the volatile dynamic memory may store and maintain all program, including the algorithms, system operating programs, Secure ID comparison and matching programs, and the like; and the volatile dynamic memory further may store, maintain and make available for use all data and results of operations such as fixed codes, resultant codes, dynamic variables and the like.

Therefore, in methods and systems disclosed herein, an apparatus (e.g., a server or an electronic device) may obtain Secure IDs for a beacon or a set of beacons. The apparatus may obtain the Secure IDs in a variety of ways, which are not limited by the present disclosure. For example, the apparatus may be a device that obtains the Secure IDs from a server. The server may calculate the Secure IDs to provide to devices and/or beacons. In some embodiments, the server may interface with an application to provide the Secure IDs to a device, or the device may call the Server to request Secure IDs, or the Secure IDs may be periodically updated. In addition, the server may provide the algorithm and other information (e.g., the variable data, dynamic variable(s), and fixed data) to the device and the device may determine the Secure IDs. Similarly, the beacon(s) may obtain the Secure IDs in various ways, including those discussed herein for a device.

Figure 1:
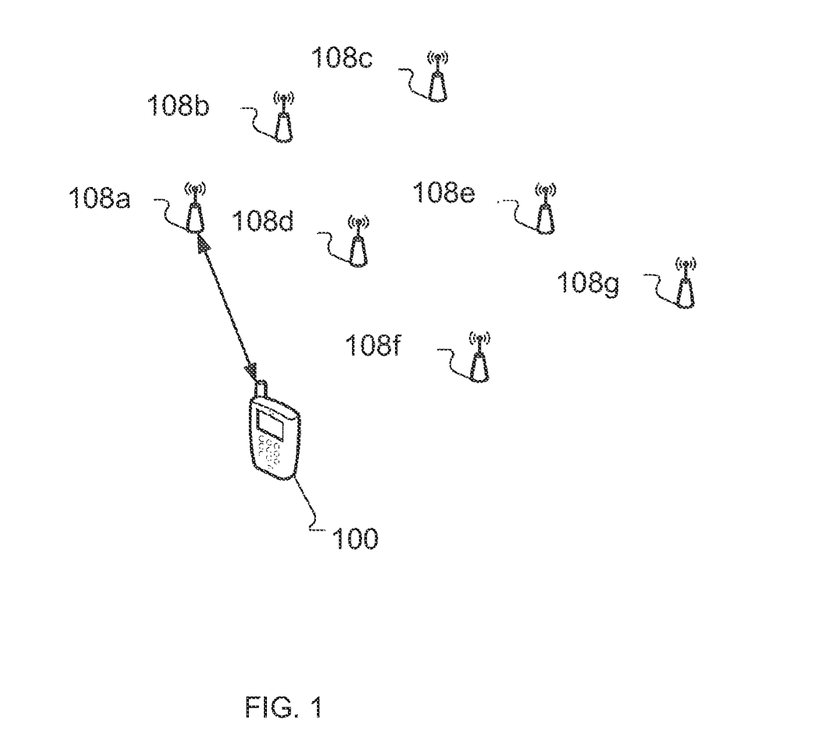
FIG. 1 shows an illustrative system in accordance with various embodiments of the present disclosure.

Turning to FIG. 1, FIG. 1 shows an illustrative system in accordance with various embodiments of the present disclosure. For example, FIG. 1 shows an illustrative beacon network in accordance with various embodiments of the present disclosure, as described herein.

Mobile device 100 can be located within communication range of beacons 108a-g. Mobile device 100 can be connected to one of the beacons 108a-g (e.g., 108a). From beacon 108a, mobile device 100 can receive data that includes information on the location of beacon 108a. Mobile device 100 can store the received data on a storage device (e.g., a flash memory device) coupled to mobile device 100. The stored data can be updated periodically. In some implementations, beacons 108a-g can be BLEs and mobile device 100 can identify BLEs 108a-g using communication protocols described in Bluetooth® Core Specification 4.0. BLEs 108a-g can be identified by unique identifiers, as described in the Bluetooth® Core Specification 4.0.

In some embodiments, mobile device 100 can be located within a geographic location defined by the beacon network 108a-g. Such a physical location can define a geographic area for which specific location based services are available to mobile device 100. For example, when mobile device is in the communication range of beacon 108a, mobile device 100 can receive a broadcast signal having a payload portion that contains the location of beacon 108a, together with other information. Other information can include, for example, a URL that can be used by a browser application running on mobile device 100 to access web-based services associated with the beacon network 108a-g. Other information can also provide context information, such as a description of the location, or advertise location based services that are available to mobile device 100. For example, if a mobile device user is in a museum or large parking garage, beacon 108a can inform mobile device 100 of such context and advertise various services available in the museum. In some implementations, beacon 108a can provide mobile device with locations for other beacons (e.g., beacons 108b-g) in the beacon network. These beacon locations can be shown on a map displayed on mobile device 100.

Figure 2:
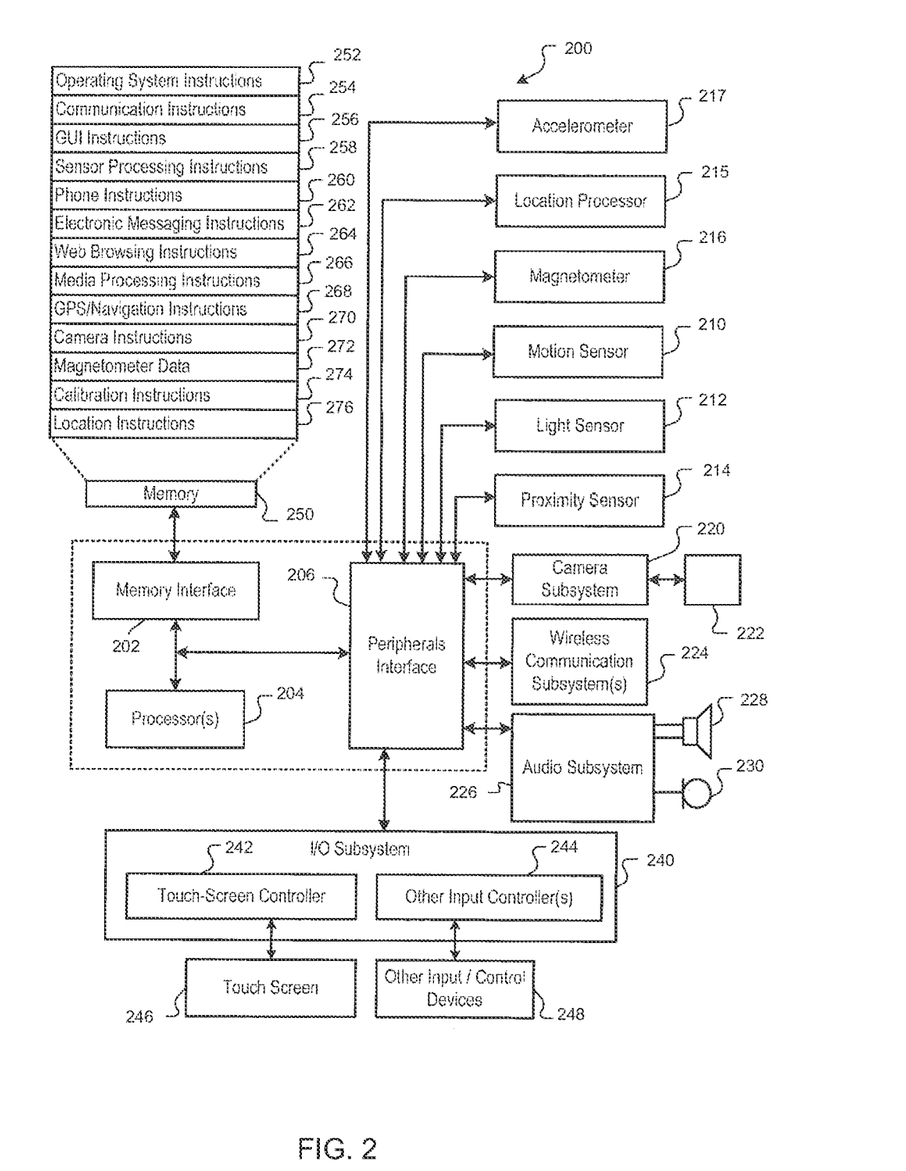
FIG. 2 is a block diagram of an illustrative device architecture of a mobile device implementing the features and operations described in reference to FIG. 1, in accordance with various embodiments of the present disclosure.

FIG. 2 shows a block diagram of an illustrative architecture 200 for the mobile devices of FIG. 1. A mobile device can include memory interface 202, one or more data processors, image processors and/or processors 204, and peripherals interface 206. Memory interface 202, one or more processors 204 and/or peripherals interface 206 can be separate components or can be integrated in one or more integrated circuits. Processors 204 can include one or more application processors (APs) and one or more baseband processors (BPs). The application processors and baseband processors can be integrated in one single process chip. The various components in mobile device 100, for example, can be coupled by one or more communication buses or signal lines.

Sensors, devices, and subsystems can be coupled to peripherals interface 206 to facilitate multiple functionalities. For example, motion sensor 210, light sensor 212, and proximity sensor 214 can be coupled to peripherals interface 206 to facilitate orientation, lighting, and proximity functions of the mobile device. Location processor 215 (e.g., GPS receiver) can be connected to peripherals interface 206 to provide geopositioning. Electronic magnetometer 216 (e.g., an integrated circuit chip) can also be connected to peripherals interface 206 to provide data that can be used to determine location. Accelerometer 217 can also be connected to peripherals interface 206 to provide data that can be used to determine location. Camera subsystem 220 and an optical sensor 222, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 224, which can include radio frequency receivers and transmitters and/or optical (e.g., infrared) receivers and transmitters. The specific design and implementation of the communication subsystem 224 can depend on the communication network(s) over which a mobile device is intended to operate. For example, a mobile device can include communication subsystems 224 designed to operate over a GSM network, a GPRS network, an EDGE network, a Wi-Fi or WiMax network, and a Bluetooth® network. In particular, the wireless communication subsystems 224 can include hosting protocols such that the mobile device can be configured as a base station for other wireless devices.

Audio subsystem 226 can be coupled to a speaker 228 and a microphone 230 to facilitate voice-enabled functions, such as voice recognition, voice replication, digital recording, and telephony functions.

I/O subsystem 240 can include touch screen controller 242 and/or other input controller(s) 244. Touch-screen controller 242 can be coupled to a touch screen 246 or pad. Touch screen 246 and touch screen controller 242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 246.

Other input controller(s) 244 can be coupled to other input/control devices 248, such as one or more buttons, rocker switches, thumb-wheel, infrared port, USB port, and/or a pointer device such as a stylus. The one or more buttons (not shown) can include an up/down button for volume control of speaker 228 and/or microphone 230.

Memory interface 202 can be coupled to memory 250. Memory 250 can include high-speed random access memory and/or non-volatile memory, such as one or more magnetic disk storage devices, one or more optical storage devices, and/or flash memory (e.g., NAND, NOR). Memory 250 can store operating system 252, such as Darwin, RTXC, LINUX, UNIX, OS X, WINDOWS, or an embedded operating system such as VxWorks. Operating system 252 may include instructions for handling basic system services and for performing hardware dependent tasks. In some implementations, operating system 252 can include a kernel (e.g., UNIX kernel).

Memory 250 may also store communication instructions 254 to facilitate communicating with one or more additional devices, one or more computers and/or one or more servers. The memory 250 may also store other software instructions (not shown), such as security instructions, web video instructions to facilitate web video-related processes and functions, and/or web shopping instructions to facilitate web shopping-related processes and functions.

Each of the above identified instructions and applications can correspond to a set of instructions for performing one or more functions described herein. These instructions need not be implemented as separate software programs, procedures, or modules. Memory 250 can include additional instructions or fewer instructions. Furthermore, various functions of the mobile device may be implemented in hardware and/or in software, including in one or more signal processing and/or application specific integrated circuits.

Figure 3:
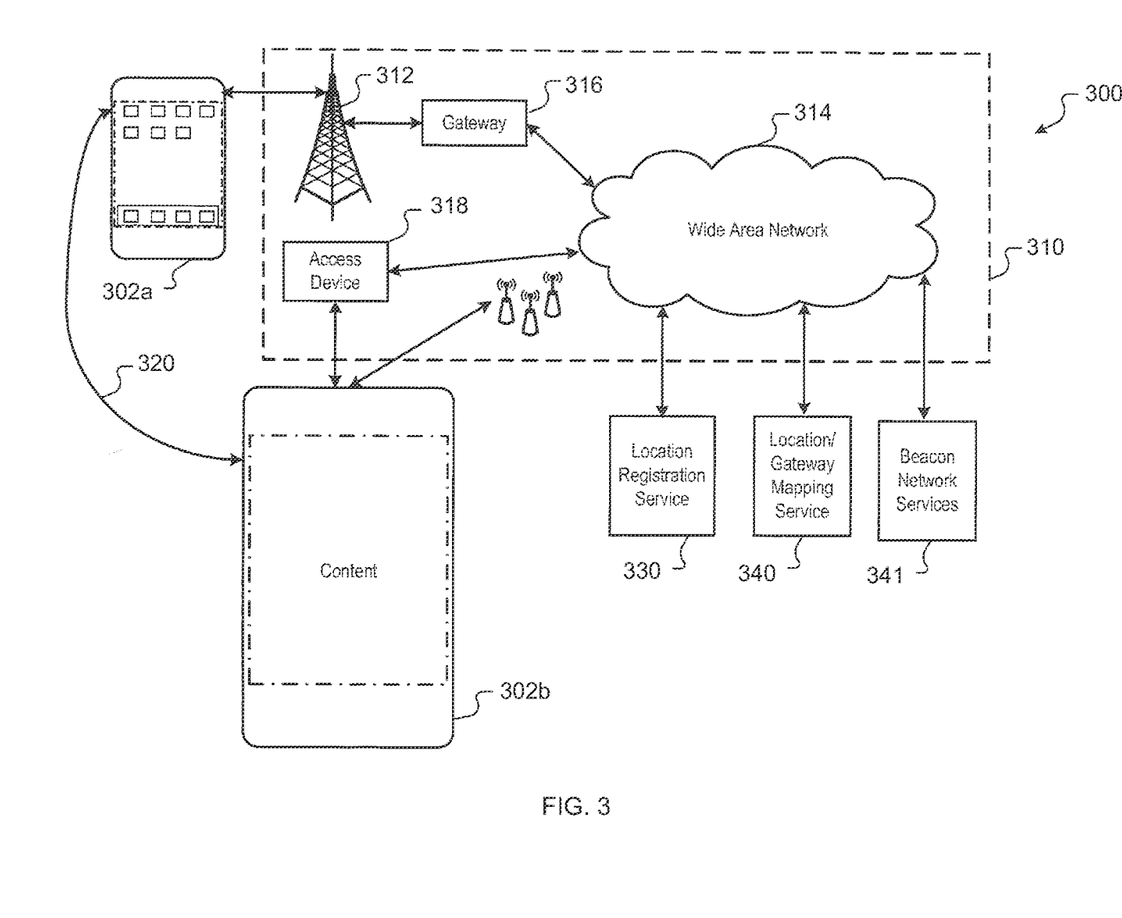
FIG. 3 is a block diagram of an illustrative network operating environment for the devices of FIGS. 1 and 2, in accordance with various embodiments of the present disclosure.

FIG. 3 shows a block diagram of illustrative network operating environment 300 for the devices of FIGS. 1 and 2. Mobile devices 302a and 302b can, for example, communicate over one or more wired and/or wireless networks 310 in data communication. For example, a wireless network 312, e.g., a cellular network, can communicate with a wide area network (WAN) 314, such as the Internet, by use of a gateway 316. Likewise, an access device 318, such as an 802.11g wireless access device, can provide communication access to the wide area network 314.

In some implementations, both voice and data communications can be established over wireless network 312 and the access device 318. For example, mobile device 302a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 312, gateway 316, and wide area network 314 (e.g., using Transmission Control Protocol/Internet Protocol (TCP/IP) or User Datagram Protocol (UDP)). Likewise, in some implementations, the mobile device 302b can place and receive phone calls, send and receive e-mail messages, and retrieve electronic documents over the access device 318 and the wide area network 314. In some implementations, mobile device 302b can communicate with one or more beacons 342 (e.g., BLE's) over a short range communication link, as described in reference to FIG. 1.

Mobile devices 302a and 302b can also establish communications by other means. For example, wireless device 302a can communicate with other wireless devices, e.g., other mobile devices 302a or 302b, cell phones, etc., over the wireless network 312. Likewise, mobile devices 302a and 302b can establish peer-to-peer communications 320, e.g., a personal area network, by use of one or more communication subsystems, such as the Bluetooth® communication devices. Other communication protocols and topologies can also be implemented.

The mobile device 302a or 302b can, for example, communicate with one or more services 330 and 340 over the one or more wired and/or wireless networks. For example, one or more location registration services 330 can be used to associate application programs with geographic regions. The application programs that have been associated with one or more geographic regions can be provided for download to mobile devices 302a and 302b.

Location-gateway mapping service 340 can determine one or more identifiers of wireless access gateways associated with a particular geographic region, and provide the one or more identifiers to mobile devices 302a and 302b for registration in association with a baseband subsystem. Beacon network services 341 can provide location based services associated with a beacon network, as described in reference to FIG. 1.

Mobile device 302a or 302b can also access other data and content over the one or more wired and/or wireless networks. For example, content publishers, such as news sites, Rally Simple Syndication (RSS) feeds, web sites, blogs, social networking sites, developer networks, etc., can be accessed by mobile device 302a or 302b. Such access can be provided by invocation of a web browsing function or application (e.g., a browser) in response to a user touching, for example, a Web object.

A number of implementations of the present disclosure have been described herein. Nevertheless, it will be understood that various modifications can be made without departing from the spirit and scope of the invention.

Figure 4:
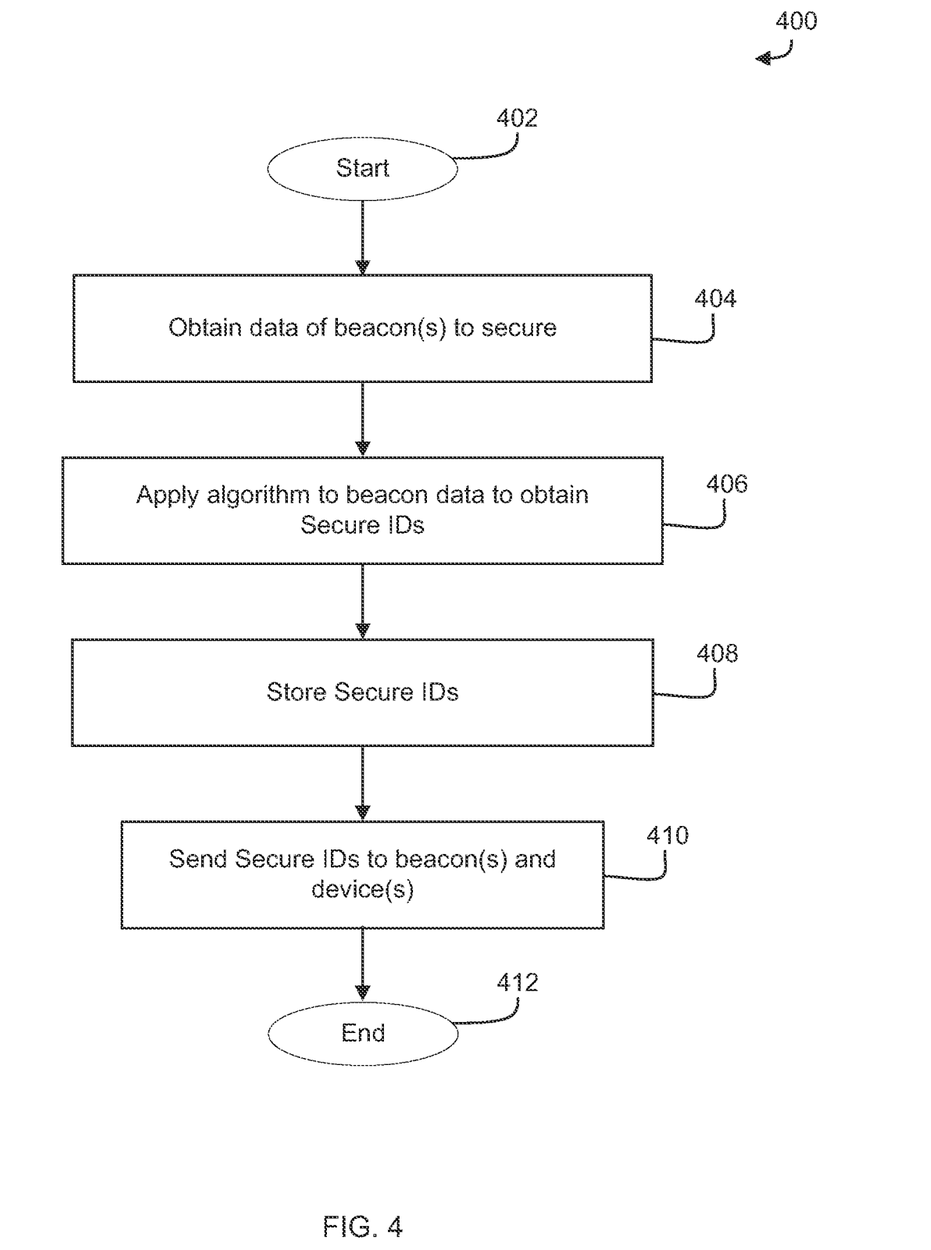
FIG. 4 is an illustrative flow diagram of methods in accordance with various embodiments of the present disclosure.

FIG. 4 shows an illustrative flow diagram of methods 400 in accordance with various embodiments of the present disclosure. In step 402 the method starts and proceeds to step 404, where data related to one or more beacons needing to be secured is obtained. In various embodiments, the data may be obtained by a device, or by a server, for example. The data may be obtained upon contact from the beacon to a server; for example, if the beacon has run out of Secure IDs and requires a new set of Secure IDs to incorporate into its transmissions. The data may also be obtained at the initiation of the server. For example, the server may know that the beacon is in need of a set of new Secure IDs, or that it is a new or reconfigured beacon in need of Secure IDs. The data relating to the beacons may include various identification data, as well as algorithms, timing, and static and dynamic variable data.

The method then proceeds to step 406. In step 406, one or more algorithms are applied to the beacon data to obtain a set of Secure IDs. One algorithm may be applied to major and minor identifications, as well as hardware and software identifications, associated with the beacon. In further embodiments, various algorithms may be used on different types of data to obtain sets of Secure IDs. As discussed herein, the Secure IDs may be based on time variables.

In step 408, the Secure IDs are stored, and in step 410, sets of Secure IDs are sent to the beacon and/or devices. In various embodiments, the Secure IDs may also be stored on the beacon or device, and the beacon may be pre-loaded with Secure IDs and methods for their incorporation into transmissions prior to the beacon being deployed. In step 412, the method ends.

Figure 5:
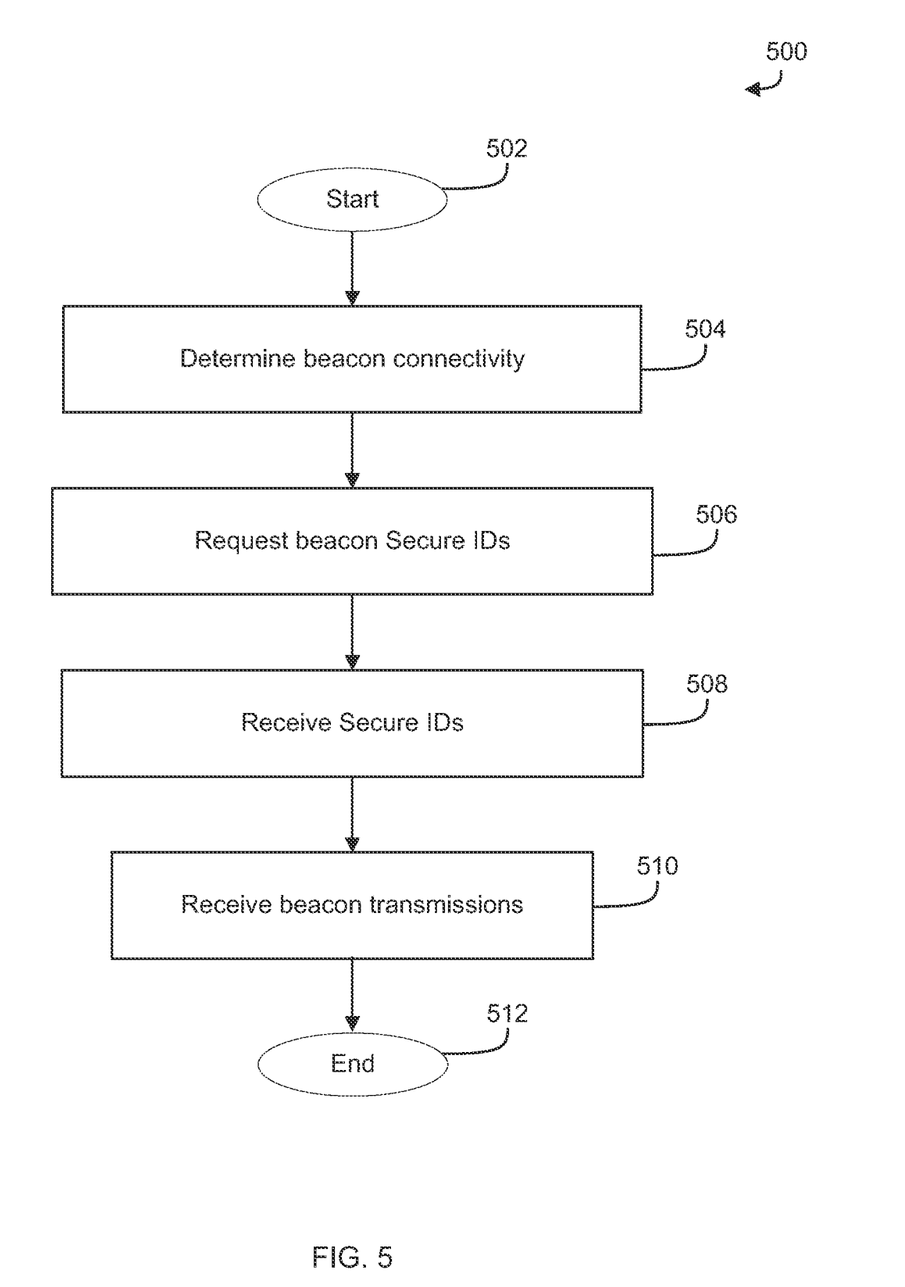
FIG. 5 is an illustrative flow diagram of methods in accordance with various embodiments of the present disclosure.

FIG. 5 shows an illustrative flow diagram of methods 500 in accordance with various embodiments of the present disclosure. In step 502, the method starts and in step 506, beacon Secure IDs are requested. In various embodiments, the Secure IDs may be requested by a device, or an application on a mobile device. The Secure IDs may be requested from a server, where the server has knowledge of (or the ability to calculate) the Secure IDs in use by the beacon. The Secure IDs may be sent automatically by the server, without any request from a mobile device, and new Secure IDs may be updated automatically.

Various embodiments of the present disclosure include verification of Secure ID data. For example, a server may obtain Secure ID information, as well as timing information, from a beacon. The server may have stored the previously calculated sets of Secure IDs, together with the corresponding timing information, for the beacon in question. Confirmation of the Secure IDs being used by the beacon may occur when the server compares the data sent by the beacon with the data stored on the server that is related to the beacon. If discrepancies are present, the server may take various actions, such as disabling the beacon, resending the Secure ID information to the beacon, resetting timing information on the beacon, recalculating a new set of Secure IDs and sending them to the beacon, or multiple other actions.

In step 508, the Secure IDs are received by the beacon. The Secure IDs may be received wirelessly, or the beacon may be tethered to a device that transfers the information to the beacon, or reprograms the beacon. The beacon then may begin transmitting data that includes the specific Secure IDs corresponding to specific variables of time. In step 510, the beacon transmissions are received by a device. Because the device knows the Secure IDs and the correlated timing information, the device can associate the beacon with its location. Thus, the device may maintain receipt of data from the beacon. In step 512, the method ends.

Figure 6:
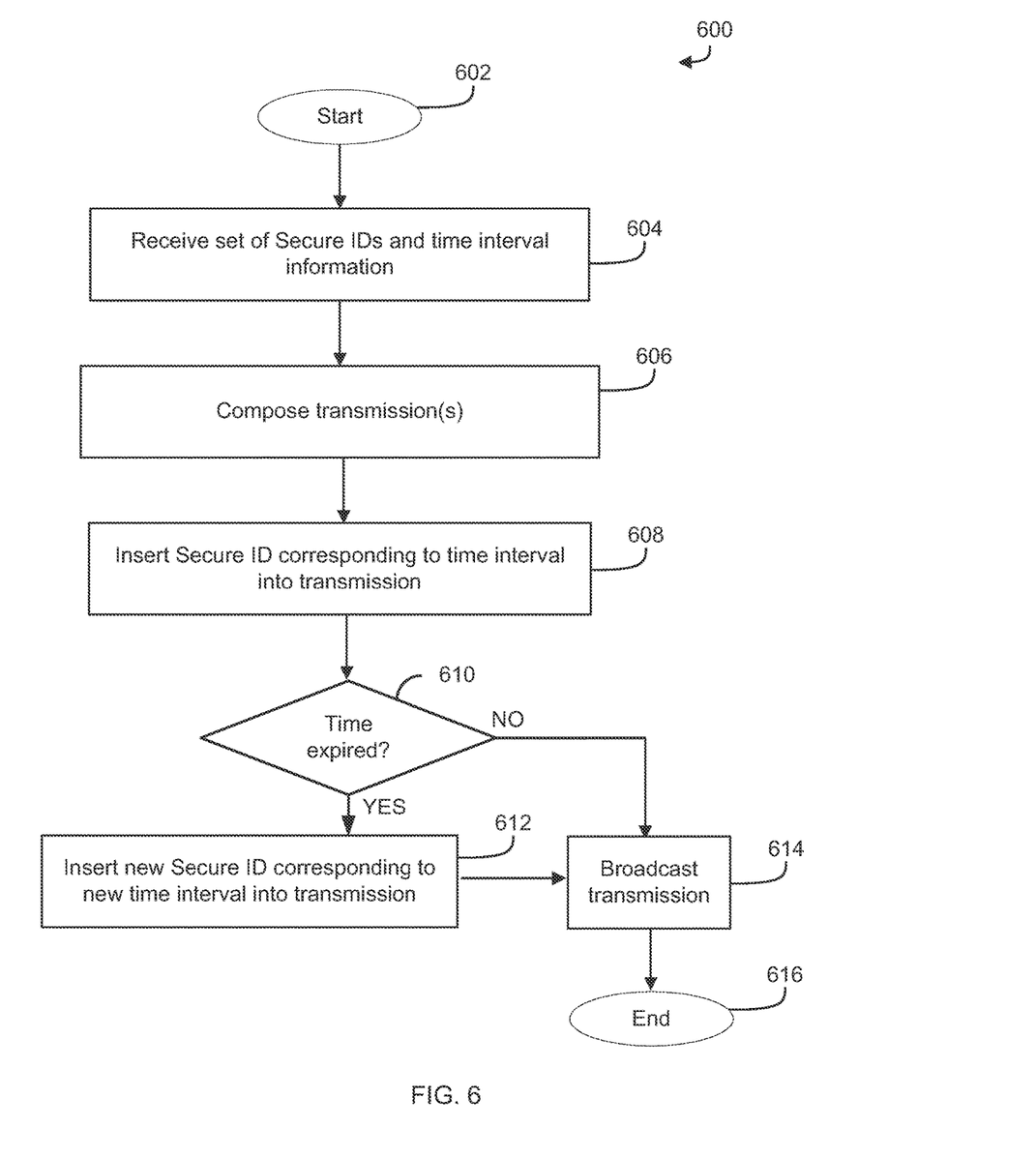
FIG. 6 is an illustrative flow diagram of methods in accordance with various embodiments of the present disclosure.

FIG. 6 shows an illustrative flow diagram of methods 600 in accordance with various embodiments of the present disclosure. In step 602, the method starts. In step 604, a set of Secure IDs and their corresponding time interval information is received by a beacon by methods and systems in accordance with the various embodiments disclosed herein.

In step 606, the beacon composes a transmission to broadcast. The transmission may contain identifying information about the beacon that has been encoded using Secure IDs, as well as other information, such as location specific advertising. Thus, in step 608, the beacon inserts a Secure ID into the transmission. In some embodiments, the beacon may obtain the Secure ID from a sequential list, without verifying that the Secure ID corresponds to a time variable that matches a current time. In step 610, for example prior to broadcasting the transmission, the beacon performs a verification step to check the current time in order to see if the current time matches a time interval that corresponds to the Secure ID in the composed transmission. If the time has not expired (so that the Secure ID in the transmission remains valid for the current time), the transmission is broadcast in step 614.

If the time has expired (so that the Secure ID in the transmission is not valid for the current time), a new (e.g., a valid) Secure ID corresponding to the current time is inserted into the transmission and the previous Secure ID is removed, and the method proceeds to step 614, where the transmission is broadcast. In step 616, the method ends.

Example

Below is an example data set shown in Table 1. In Table 1, the example data set includes data for a first fifty days of a year with certain seed and random value ranges. A universally unique identifier (UUID) of the beacon can be any string value, including a series of numbers, as shown in Table 1. Table 1 also shows major and minor identification values, which are numbers with a simple obfuscation algorithm applied in this illustrative example. In this data set, every value changes on a daily (24-hour) timeframe. The UUIDs displayed below use a random number generator to generates a same sequence when given a same seed value. The major and minor identifications use a simple obfuscation formula that employs day of year and day of week values of a current time. In various other embodiments, random numbers could be used for the major and minor identification values.

TABLE 1

| Day Of Year UTC Based Time | Day Of Week UTC Based Time | Device Id (HW UUID) Seed(123456789) 0-9999999999999999999 | Beacon UUID Seed(987654321) 0-9999999999999999999 | Beacon Major Id 45 | Beacon 2342 |
|---|---|---|---|---|---|
| 1  | 1 | 9829034413497462428 | 1346397099479505362 | 44    | 2341  |
| 2  | 2 | 9853081252584626137 | 3985170032619530342 | 178   | 4680  |
| 3  | 3 | 9399594453629354781 | 8573188687628562593 | 402   | 7017  |
| 4  | 4 | 2492393879732137722 | 9175664654362916799 | 716   | 9352  |
| 5  | 5 | 1160953247570454509 | 2053753588495163622 | 1120  | 11685 |
| 6  | 6 | 2857383695231847136 | 9703815449161014440 | 1614  | 14016 |
| 7  | 7 | 8737945829278012020 | 4965684919175297674 | 2198  | 16345 |
| 8  | 1 | 5138013226910327122 | 7100120450722057380 | 359   | 18728 |
| 9  | 2 | 4598994217489683052 | 437928122470486386  | 808   | 21060 |
| 10 | 3 | 1806093445828228209 | 1559695641006914612 | 1347  | 23390 |
| 11 | 4 | 65558051601178986   | 5781056040236501890 | 1976  | 25718 |
| 12 | 5 | 4257685984256310415 | 8275503605822045568 | 2695  | 28044 |
| 13 | 6 | 226067317961403466  | 1358451505090265578 | 3504  | 30368 |
| 14 | 7 | 6521693525311665358 | 3140905763682461857 | 4403  | 32690 |
| 15 | 1 | 3417839913238910617 | 2946421804720054240 | 674   | 35115 |
| 16 | 2 | 7901091261141023918 | 4799885244387443839 | 1438  | 37440 |
| 17 | 3 | 5817508673192159443 | 8175802961617714562 | 2292  | 39763 |
| 18 | 4 | 7501468832309243567 | 5591267370096933645 | 3236  | 42084 |
| 19 | 5 | 9999337567158912656 | 6523775308664769741 | 4270  | 44403 |
| 20 | 6 | 4469546679897804300 | 9911110659421843754 | 5394  | 46720 |
| 21 | 7 | 4653037815292977673 | 4745475438132725857 | 6608  | 49035 |
| 22 | 1 | 2459631365929848922 | 8342826034940239147 | 989   | 51502 |
| 23 | 2 | 8860558794550616692 | 5590823078172537720 | 2068  | 53820 |
| 24 | 3 | 5226439746895719604 | 540069306776300341  | 3237  | 56136 |
| 25 | 4 | 200052798619056883  | 6439388629181907028 | 4496  | 58450 |
| 26 | 5 | 2501652514689619496 | 7407429304744957    | 5845  | 60762 |
| 27 | 6 | 1977486718367531053 | 840402840606503821  | 7284  | 63072 |
| 28 | 7 | 8237319706629597923 | 1041778313012177090 | 8813  | 65380 |
| 29 | 1 | 4911106017987704758 | 2950527706602002757 | 1304  | 67889 |
| 30 | 2 | 1070543430565354149 | 4674752709267245077 | 2698  | 70200 |
| 31 | 3 | 8460134897582923616 | 9978634506772440569 | 4182  | 72509 |
| 32 | 4 | 7293581211586772164 | 7274756692298176368 | 5756  | 74816 |
| 33 | 5 | 140286015650928553  | 5220033157412272748 | 7420  | 77121 |
| 34 | 6 | 1198201663337917864 | 7925464054145349647 | 9174  | 79424 |
| 35 | 7 | 9834359814767842898 | 1140422971358337251 | 11018 | 81725 |
| 36 | 1 | 8453694178426789466 | 8425623570717431683 | 1619  | 84276 |
| 37 | 2 | 2026861580902562396 | 774772914832268694  | 3328  | 86580 |
| 38 | 3 | 5828158276285599905 | 5246021088521392356 | 5127  | 88882 |
| 39 | 4 | 3222258639874789345 | 6583529348556272819 | 7016  | 91182 |
| 40 | 5 | 9923718272555167735 | 4008449009116196061 | 8995  | 93480 |
| 41 | 6 | 7428989301376813830 | 820366729002398332  | 11064 | 95776 |

TABLE 1-continued

| Day Of Year UTC Based Time | Day Of Week UTC Based Time | Device Id (HW UUID) Seed(123456789) 0-9999999999999999999 | Beacon UUID Seed(987654321) 0-9999999999999999999 | Beacon Major Id 45 | Beacon 2342 |
|---|---|---|---|---|---|
| 42 | 7 | 7497193246510064327 | 8104447017277637149 | 13223 | 98070 |
| 43 | 1 | 6837586634430558863 | 7291921253682443897 | 1934 | 100663 |
| 44 | 2 | 9051436648148899867 | 9382022990340071143 | 3958 | 102960 |
| 45 | 3 | 4497624572246965184 | 7128994342518285988 | 6072 | 105255 |
| 46 | 4 | 4759626890047600755 | 9517272718315124686 | 8276 | 107548 |
| 47 | 5 | 7940373006886345341 | 2071916552147770262 | 10570 | 109839 |
| 48 | 6 | 6193263514054960628 | 2816228554682530241 | 12954 | 112128 |
| 49 | 7 | 7511098281841797153 | 2887564392749571645 | 15428 | 114415 |
| 50 | 1 | 4300067443973599769 | 7641933484526649608 | 2249 | 117050 |

Table 1 advantageously shows how beacon identification data can be secured. For example, the illustrative beacon data in Table 1 is altered by various algorithms to obtain a set of Secure IDs that changes over time and based upon a time variable. Thus, beacon transmissions that use the secure data of Table 1 in systems and methods disclosed herein are advantageously secured from unauthorized use.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A system, comprising:
a beacon storing a static, unique, beacon identifier, the beacon configured to calculate a secure identifier associated with a time interval, a format of the secure identifier matching a format of the static, unique, beacon identifier, the beacon configured to transmit the secure identifier during the time interval;
a server storing the static unique beacon identifier, the server configured to receive the secure identifier from a mobile device, the server configured to verify the secure identifier based on the time interval and the static, unique, beacon identifier without receiving the static, unique, beacon identifier from the mobile device such that the mobile device can receive content associated with the beacon.

2. The system of claim 1, wherein the beacon is a first beacon, the static, unique, beacon identifier is a first static, unique, beacon identifier associated with the first beacon, the secure identifier is a first secure identifier, and the mobile device is a first mobile device, the system further comprising:
a second beacon storing a second static, unique, beacon identifier, the second beacon configured to calculate a second secure identifier based on the time interval and the second static, unique, beacon identifier, the second secure identifier different from the first secure identifier, the server storing the second static, unique, beacon identifier, the server configured to receive the second secure identifier from a second mobile device, the server configured to verify the second secure identifier based on the time interval and the second static, unique, beacon identifier without receiving the second static, unique, beacon identifier from the second mobile device such that the second mobile device can receive content associated with the second beacon.

3. The system of claim 1, wherein:

the time interval is a first time interval, the secure identifier is a first secure identifier associated with the first time interval, and the mobile device is a first mobile device;

the beacon is configured to calculate a plurality of secure identifiers including the first secure identifier, each secure identifier from the plurality of secure identifiers is calculated based on the static, unique, beacon identifier and a time interval from a plurality of time intervals such that each secure identifier is uniquely associated with that time interval from the plurality of time intervals, a format of each secure identifier from the plurality of secure identifiers matching a format of the static, unique, beacon identifier, the beacon configured to broadcast each secure identifier from the plurality of secure identifiers only during a time interval uniquely associated with that secure identifier; and the server is configured to calculate the plurality of secure identifiers, each secure identifier from the plurality of secure identifiers calculated based on the static, unique, beacon identifier and a time interval from the plurality of time intervals, the server configured to receive a second secure identifier from a second mobile device during a second time interval, the server configured to verify the second secure identifier without receiving the static, unique, beacon identifier from the second mobile device based on the static, unique, beacon identifier and the second time interval such that the second mobile device can receive content associated with the beacon.

4. The system of claim 1, wherein a clock of the server is synchronized with a clock of the beacon.

5. The system of claim 1, wherein:

the time interval is a first time interval from a plurality of time intervals, the secure identifier is a first secure identifier from a plurality of secure identifiers, and the first secure identifier is associated with the first time interval;

the beacon includes a clock and is configured to calculate a plurality of values of a dynamic variables using a beacon random number generator with a seed value, each value of the dynamic variable from the plurality of values of the dynamic variable associated with a time interval from the plurality of time intervals in a sequential fashion, the beacon configured to calculate the plurality of secure identifiers based on the static, unique, beacon identifier and a value of the dynamic variable from the plurality of values of the dynamic variable, each secure identifier from the plurality of secure identifiers having a format matching the static, unique, beacon identifier, each secure identifier from the plurality of secure identifiers being uniquely associated with a time interval from the plurality of time intervals based on that secure identifier being calculated based on a value of the dynamic variable from the plurality of values of the dynamic variable that is sequentially associated with that time interval; and the server includes a clock synchronized to the clock of the beacon, the server is configured to calculate the plurality of values of the dynamic variable using a server random number generator with the seed value such that the server generates a sequence of values of the dynamic variable matching the values of the dynamic variable calculated by the beacon and corresponding to the plurality time intervals used by the beacon to calculate the plurality of values of the dynamic variable, the server configured to calculate the plurality of secure identifiers based on the static, unique, beacon identifier and the plurality of values of the dynamic variable, the server configured to verify the first secure identifier by matching the first secure identifier received from the mobile device to a secure identifier from the plurality of secure identifiers calculated by the server that is uniquely associated with the first time interval.

6. A non-transitory processor readable medium storing code representing instructions configured to be executed by a processor, the code comprising code to cause the processor to:

receive, during a time interval, at a server, and from a mobile device, a secure identifier associated with a beacon, a format of the secure identifier matching a format of a static, unique, beacon identifier; and verify the secure identifier based on the time interval and the static, unique, beacon identifier, the static, unique, beacon identifier stored at the server and not received from the mobile device, the mobile device verified such that the mobile device can receive content associated with the beacon.

7. The non-transitory processor readable medium of claim 6, wherein the code to cause the processor to verify the secure identifier further includes code to cause the processor to:

calculate the secure identifier based on the static, unique, beacon identifier, and a value of a dynamic variable associated with the time interval and synchronized with a clock of the beacon.

8. The non-transitory processor readable medium of claim 6, the code further comprising code to cause the processor to record the secure identifier received from the mobile device.

9. The non-transitory processor readable medium of claim 6, the code further comprising code to cause the processor to:

synchronize a first clock maintained by a server with a second clock maintained by the beacon; and calculate the secure identifier based on the static, unique beacon identifier and a value of the first clock during the time interval.

10. The non-transitory processor readable medium of claim 6, wherein the secure identifier is a first secure identifier from a plurality of secure identifiers, the time interval is a first time interval, the code to cause the processor to verify the secure identifier further includes code to cause the processor to:

calculate the plurality of secure identifiers, each secure identifier from the plurality of secure identifiers calculated based on the static, unique, beacon identifier and a dynamic variable, the dynamic variable associated time such that the first secure identifier calculated based on a value of the dynamic variable associated with the first time interval.

11. The non-transitory processor readable medium of claim 6, wherein the secure identifier is a first secure identifier and the time interval is a first time interval, the code further comprising code to cause the processor to:

calculate a plurality of secure identifiers based on the static, unique, beacon identifier, each secure identifier from the plurality of secure identifiers associated with a different time interval from a plurality of time intervals and having the format of the static, unique, beacon identifier.

12. The non-transitory processor readable medium of claim 6, wherein the secure identifier is a first secure identifier and the time interval is a first time interval, the code further comprising code to cause the processor to:

calculate a plurality of secure identifiers based on the static, unique, beacon identifier, each secure identifier from the plurality of secure identifiers associated with a different time interval from a plurality of time intervals and having the format of the static, unique, beacon identifier; and send the plurality of secure identifiers to the beacon in a batch such that the beacon broadcasts a different secure identifier for each time interval from the plurality of time intervals.

13. The non-transitory processor readable medium of claim 6, wherein the mobile device is a first mobile device, the time interval is a first time interval from a plurality of time intervals, the secure identifier is a first secure identifier from a plurality of secure identifiers, and the first secure identifier is associated with the first time interval, the code further comprising code to cause the processor to:

calculate the plurality of secure identifiers, including the first secure identifier and a second secure identifier, each secure identifier from the plurality of secure identifiers calculated based on the static, unique, beacon identifier and a value of a dynamic variable, the dynamic variable associated with time such that each value of the dynamic variable is uniquely associated with a different time interval from the plurality of time intervals, the second secure identifier calculated based on the static, unique, beacon identifier and a value of the dynamic variable associated with a second time interval, the second time interval being after the first time interval;

receive, during the second time interval, at the server, and from a second mobile device, the second secure identifier; and verify the second mobile device based on the second secure identifier received from the second mobile device matching the second secure identifier calculated with the plurality of secure identifiers and based on the second secure identifier being received during the second time interval.

14. The non-transitory processor readable medium of claim 6, wherein the mobile device is a first mobile device, the time interval is a first time interval from a plurality of time intervals, a second time interval from the plurality of time intervals is after the first time interval, the secure identifier is a first secure identifier from a plurality of secure identifiers, and the first secure identifier is associated with the first time interval, the code further comprising code to cause the processor to:

calculate a plurality of values of a dynamic variables using a random number generator with a seed value, each value of the of the dynamic variable from the plurality of values of the dynamic variables associated with a time interval from the plurality of time intervals in a sequential fashion;

calculate the plurality of secure identifiers, the plurality of secure identifiers including the first secure identifier and a second secure identifier, each secure identifier from the plurality of secure identifiers calculated based on the static, unique, beacon identifier and a value of the dynamic variable from the plurality of values of the dynamic variables, the second secure identifier calculated based on the static, unique, beacon identifier and a value of the dynamic variable associated with a second time interval after the first time interval, each secure identifier from the first plurality of secure identifiers having the format of the static, unique, beacon identifier;

receive, during the second time interval, at the server, and from a second mobile device, the second secured identifier; and verify the second mobile device based on the second secure identifier received from the second mobile device matching the second secure identifier calculated with the plurality of secure identifiers and based on the second secure identifier being received during the second time interval.

15. The non-transitory processor readable medium of claim 6, wherein the secure identifier is a first secure identifier associated with a first time interval, the code further comprising code to cause the processor to:

calculate a plurality of secure identifiers based on the static, unique, beacon identifier, each secure identifier from the plurality of secure identifiers associated with a different time interval from a plurality of time intervals and having the format of the static, unique, beacon identifier, a different secure identifier being serially broadcast by the beacon for each time interval from the plurality of time intervals, each secure identifier from the plurality of secure identifiers calculated based on a pseudorandom value such that an observer receiving a first secure identifier from the plurality of secure identifiers and a second secure identifier from the plurality of secure identifiers would be unable to predict any other secure identifier from the plurality of secure identifiers.

16. The non-transitory processor readable medium of claim 6, the code further comprising code to cause the processor to calculate a plurality of values of a dynamic variable using a random number generator with a seed value, the secure identifier calculated based on the static, unique, beacon identifier and a first value of the dynamic variable that is associated with the time interval, the first value of the dynamic variable being from the plurality of values of the dynamic variable.

17. The non-transitory processor readable medium of claim 6, the code further comprising code to cause the processor to calculate the secure identifier based on a value of a dynamic variable associated with the time interval.

18. The non-transitory processor readable medium of claim 6, wherein, the time interval is a first time interval, and the secure identifier is a first secure identifier, the code further comprising code to cause the processor to calculate the first secure identifier based on a first value of a dynamic variable associated with the first time interval; and calculate a second secure identifier based on the static, unique, beacon identifier and a second value of the dynamic variable associated with a second time interval, the second value of the dynamic variable predictable based on the first value of the dynamic variable, the second secure identifier not being predictable based on the first secure identifier.

19. The non-transitory processor readable medium of claim 6, the code further comprising code to cause the processor to:
synchronize the first time interval with timing information maintained by the beacon based on receiving the secure identifier during the time interval.

20. A non-transitory processor readable medium storing code representing instructions configured to be executed by a processor of a beacon, the code comprising code to cause the processor to:
calculate, a first value of a dynamic variable associated with a first time interval and a static, unique, beacon identifier associated with the beacon;
calculate a first secure identifier based on the first value of the dynamic variable, the first secure identifier having a format matching a format of the static, unique, beacon identifier;
broadcast the first secure identifier and not the static, unique, beacon identifier during the first time interval;
calculate a second value of the dynamic variable associated with a second time interval and the static, unique, beacon identifier;
calculate a second secure identifier based on the second value of the dynamic variable, the second secure identifier having the format matching the format of the static, unique, beacon identifier; and
broadcast the second secure identifier and not the static, unique, beacon identifier during the second time interval.

21. The non-transitory processor readable medium of claim 20, wherein the code to calculate the second value of the dynamic variable further includes code to cause the processor to calculate the second value of the dynamic variable based, in part, on the first value of the dynamic variable.

22. The non-transitory processor readable medium of claim 20, wherein a third secure identifier associated with a third time interval is not predictable based only on the first secure identifier and the second secure identifier.

23. The non-transitory processor readable medium of claim 20, the code further comprising code to cause the processor to:
calculate a third value of the dynamic variable associated with a third time interval and the static, unique, beacon identifier, the third value of the dynamic variable not being predictable based only on the first secure identifier and the second secure identifier.

* * * * *